United States Patent Office 2,715,142
Patented Aug. 9, 1955

2,715,142

PROCESS FOR PREPARING VINYL SULFONAMIDES

Harold F. Park, East Longmeadow, Mass., assignor to Monsanto Chemical Company, St. Louis, Mo., a corporation of Delaware No Drawing. Application February 23, 1954, Serial No. 412,109

8 Claims. (Cl. 260—556)

This invention relates to vinyl mono- and disulfonamides. More particularly, this invention relates to a process for preparing vinyl mono- and disulfonamides.

This application is a continuation-in-part of application Serial No. 274,514, filed March 1, 1952.

The vinyl mono- and disulfonamides are unsaturated compounds. Theoretically, it should be possible to prepare the vinyl sulfonamides from the corresponding ammonium salts of mono- and disulfonic acids by a vapor phase dehydration process. However, every attempt to carry out the dehydration in this manner has resulted in a black insoluble tar.

Accordingly, an object of the present invention is the provision of a process for preparing vinyl mono- and disulfonamides.

Another object is the provision of a process for the preparation of vinyl mono- and disulfonamides by the vapor phase dehydration of the ammonium salt of the corresponding vinyl mono- or disulfonic acids.

These and other objects are attained by heating to a temperature of about 250–400° C., an ammonium salt of vinyl mono- or disulfonic acid in the presence of a small quantity of sulfur or a substituted phenol which will not readily volatilize at the temperature used, to thereby cause the evolution of the desired sulfonamide and solidifying the evolved sulfonamide to prevent decomposition of the same.

The following examples are given in illustration and are not intended as limitations on the scope of this invention. Where parts are mentioned, they are parts by weight.

*Example I*

Prepare a mixture of 100 parts of ammonium vinyl monosulfonate and 0.001 part of powdered sulfur. Place the mixture in a closed reaction vessel connected with a suitable vacuum source and a suitable water-cooled condenser. Heat the mixture to a temperature of about 300° C. at a reduced pressure of about 40 mm. of mercury. The ammonium salt is quickly dehydrated to vinyl sulfonamide which is volatile at this temperature and pressure. The vinyl sulfonamide is collected in the condenser substantially simultaneously with its evolution. If the ammonium vinyl sulfonate is subjected to the same conditions in the absence of sulfur, a worthless tar remains in the reaction vessel and no vinyl sulfonamide is recovered.

*Example II*

To 100 parts of a mixture of the ammonium salt of vinyl monosulfonic acid and the ammonium salt of vinyl disulfonic acid, add 0.01 part of 2,4-ditertiary amyl phenol. Place the resultant mixture in a suitable closed reaction vessel connected with a suitable vacuum source and a water-cooled condenser. Heat the mixture to a temperature of about 300° C. at a reduced pressure of about 40 mm. of mercury. The ammonium salts are quickly dehydrated to vinyl mono- and disulfonamides, which compounds are volatile at this temperature and pressure. The sulfonamides are collected in the condenser substantially simultaneously with their evolution. If the mixture of ammonium salts is subjected to the same conditions in the absence of the phenolic compound, a worthless tar remains in the reaction vessel and there is no recovery of the vinyl sulfonamides.

*Example III*

Place a mixture of 100 parts of ammonium vinyl sulfonate and about 0.01 part of octadecyl catechol on a perforated support in a suitable reaction vessel fitted with a water-cooled condenser. Blow nitrogen which has been heated to a temperature of about 350° C. through the mixture. The ammonium vinyl sulfonate is dehydrated to vinyl sulfonamide and the vinyl sulfonamide is collected in the condenser substantially simultaneously with its evolution.

The starting materials of the present invention are the ammonium salts of mono- and disulfonic acids of ethylene. If only one sulfonic acid salt is present the compound is ammonium vinyl sulfonate. If two sulfonic acid salt groups are present, they may be on the same or different carbon atoms. When they are on the same carbon atom, the compound may be called ammonium vinylidene sulfonate or 1,1-ethylene diammonium sulfonate. When there is a sulfonic acid salt group on each of the carbon atoms, the compound may be called 1,2-ethylene diammonium sulfonate. The ammonium salts of each of these compounds may be converted to the corresponding sulfonamides by the process of the present invention.

In order to prepare sulfonamides in accordance with the present invention, the ammonium salts which form the starting materials must be admixed with a small amount of sulfur or a substituted phenol before the dehydrating reaction is started. When a substituted phenol is to be used, it should be a phenol which will not vaporize appreciably at the temperature of dehydration. Phenol, itself, and many of the substituted phenols such as ortho, meta- or paracresol will vaporize at temperatures below 250° C. and, accordingly, should not be used. However, a wide variety of mono- and poly-hydroxy phenols such as hydroquinone, ditertiary butyl paracresol, 2,4-diamyl phenol, 2,4-ditertiary amyl phenol, resorcinol, 2,4-ditertiary meta cresol, 4-octadecyl naphthol, etc. may be used with satisfactory results. As little as 0.0001 part of sulfur per 100 parts of ammonium salt may be used with satisfactory results. Larger amounts of sulfur may be used if desired and, generally speaking, the most satisfactory results are obtained within the range of about 0.0001 to 0.005 part per 100 parts of ammonium salt. When a phenol is to be used, about 0.005 part or more per 100 parts of ammonium salt should be used. However, the preferred range is about 0.01 to 0.05 part per 100 parts of ammonium salt.

The dehydration reaction should be carried out at a temperature of about 250–400° C. A temperature of about 300° C. is preferred. Within the above temperature range, the sulfonamides are volatile. It is preferable not to use a catalyst in order to prevent contamination of the product although a small amount of a dehydration catalyst may be used if desired. The dehydration is accomplished by heating the ammonium salt at atmospheric pressure or at a reduced pressure such as 40 mm. of mercury or less. Optionally, a heated inert gas may be blown through the ammonium salt.

The vinyl sulfonamides are solids at temperatures below about 200° C. and in order to prevent decomposition, it is preferable that they be cooled as soon as possible after evolution in order to prevent decomposition. This is conveniently accomplished by passing the vapors evolved during the dehydration reaction into a suitable cooling device such as a condenser so that the sulfonamides can be solidified substantially instantaneously with their evolution. The cooling device can be maintained at any temperature below about 150° C. but it is preferable to maintain the cooling device at room temperature or lower through the use of a suitable coolant such as water or Dry Ice.

It is not necessary to start with a pure sulfonic acid salt since a mixture of mono- and disulfonic acid salts may be dehydrated by the process of the present invention to yield a mixture of sulfonamides. The mixture may be resolved into the separate components by fractional crystallization from alcoholic solution.

The sulfonamides of the present invention are useful for a wide variety of purposes such as the preparation of polymers used in the preparation of textile fibers, molding powders, poly-electrolytes, etc. They may also be used as intermediates for the preparations of dyes, herbicides, etc.

What is claimed is:

1. A vapor phase process for converting ammonium vinyl sulfonate to vinyl sulfonamide which comprises heating said sulfonate to a temperature of from 250 to 400° C. in the presence of a small amount of a material taken from the group consisting of sulfur and substituted phenols which will not vaporize at the temperature used.

2. A process as in claim 1 wherein the material is sulfur.

3. A process as in claim 1 wherein the materal is a substituted phenol.

4. A process as in claim 3 in which the substituted phenol is 2,4-ditertiary amyl phenol.

5. A process as in claim 3 wherein the substituted phenol is octadecyl catechol.

6. A vapor phase process for converting ammonium vinyl sulfonate to vinyl sulfonamide which comprises heating said sulfonate to a temperature of from 250 to 400° C. at a reduced pressure in the presence of a material taken from the group consisting of sulfur and substituted phenols which will not vaporize at the temperature used, and then solidifying the evolved sulfonamide to prevent decomposition of the same.

7. A vapor phase process for converting ammonium vinyl sulfonate to vinyl sulfonamide which comprises heating said sulfonate at a reduced pressure and a temperature of from 250 to 400° C. in the presence of from 0.0001 to 0.005 part of sulfur per 100 parts of sulfonate to cause the evolution of vinyl sulfonamide and then solidifying the evolved sulfonamide substantially simultaneously with its evolution.

8. A process which comprises dehydrating ammonium vinyl sulfonate at a temperature of about 300° C. and a pressure of about 40 mm. of mercury in the presence of about 0.001 part of sulfur per 100 parts of sulfonate to cause the evolution of vinyl sulfonamide and solidifying the vinyl sulfonamide substantially simultaneously with its evolution.

References Cited in the file of this patent

UNITED STATES PATENTS

| | | |
|---|---|---|
| 2,236,825 | Mares | Apr. 1, 1941 |
| 2,356,247 | Kirk et al. | Aug. 22, 1944 |
| 2,481,080 | Castner | Sept. 6, 1949 |
| 2,668,175 | Reppe et al. | Feb. 2, 1954 |